US011968000B2

(12) United States Patent
Balachandran et al.

(10) Patent No.: US 11,968,000 B2
(45) Date of Patent: Apr. 23, 2024

(54) INTERFERENCE DETECTION AND AVOIDANCE IN CITIZEN BROADBAND RADIO SERVICE (CBRS)

(71) Applicant: TELEFONAKTIEBOLAGET LM ERICSSON (PUBL), Stockholm (SE)

(72) Inventors: Kumar Balachandran, Pleasanton, CA (US); Sailesh Bharati, Stittsville (CA); Gary Boudreau, Kanata (CA); Virgil Cimpu, Ottawa (CA); Chris Williams, Nepean (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 492 days.

(21) Appl. No.: 17/282,053

(22) PCT Filed: Oct. 4, 2019

(86) PCT No.: PCT/IB2019/058487
§ 371 (c)(1),
(2) Date: Apr. 1, 2021

(87) PCT Pub. No.: WO2020/070716
PCT Pub. Date: Apr. 9, 2020

(65) Prior Publication Data
US 2021/0344432 A1 Nov. 4, 2021

Related U.S. Application Data

(60) Provisional application No. 62/741,315, filed on Oct. 4, 2018.

(51) Int. Cl.
*H04W 24/02* (2009.01)
*H04B 17/30* (2015.01)
(Continued)

(52) U.S. Cl.
CPC ......... *H04B 17/336* (2015.01); *H04B 17/382* (2015.01); *H04W 16/14* (2013.01)

(58) Field of Classification Search
CPC .... H04B 17/336; H04B 17/382; H04W 16/14
See application file for complete search history.

(56) References Cited

U.S. PATENT DOCUMENTS 9,510,222 B2 11/2016 Yerramalli
10,271,351 B1 * 4/2019 Wang ................... H04L 5/0091
(Continued)

FOREIGN PATENT DOCUMENTS

WO 20170658521 A1 4/2017
WO 2018087663 A1 5/2018

OTHER PUBLICATIONS

3GPP TSG-RAN WG4 Meetng#85, R4-1712101 (Year: 2017).*
(Continued)

*Primary Examiner* — Diane L Lo
*Assistant Examiner* — Abusayeed M Haque
(74) *Attorney, Agent, or Firm* — Ericsson Inc.

(57) ABSTRACT

A network node of a communications network configured to provide Citizen Broadband Radio Service (CBRS) to at least one end user device (EUD) in a coverage area of the network node. The network node comprises: at least one processor; and a memory storing software instructions configured to control at least one processor to perform steps of: detecting interference from at least one aggressor device in the network; and reporting the detected interference to at least one of a Spectrum Access System (SAS) and a co-existence manager (CxM) of the communications network.

19 Claims, 7 Drawing Sheets

(51) Int. Cl.
  *H04B 17/336* (2015.01)
  *H04B 17/382* (2015.01)
  *H04W 16/14* (2009.01)

(56) References Cited

U.S. PATENT DOCUMENTS

| | | | |
|---|---|---|---|
| 2003/0223408 A1* | 12/2003 | Chen | H04L 45/306 370/352 |
| 2011/0267951 A1* | 11/2011 | Stanwood | H04L 47/2408 370/235 |
| 2012/0013748 A1* | 1/2012 | Stanwood | H04L 47/2408 348/192 |
| 2016/0255531 A1* | 9/2016 | Stein | H04L 65/60 455/575.1 |
| 2017/0180938 A1* | 6/2017 | Smith | H04W 4/08 |
| 2017/0238136 A1* | 8/2017 | Smith | H04M 1/72457 455/456.3 |
| 2019/0036629 A1 | 1/2019 | Sundaresan | |
| 2019/0058999 A1* | 2/2019 | Gunasekara | H04W 36/22 |
| 2019/0289470 A1* | 9/2019 | Vaidya | H04W 16/14 |
| 2019/0364565 A1* | 11/2019 | Hmimy | H04W 36/06 |

OTHER PUBLICATIONS

Neelakantan Nurani Krishnan, et al. "Coexistence of Radar and Communication Systems in CBRS Bands Through Downlink Power Control", IEEE Military Communications Conference, Oct. 23, 2017, pp. 713-718.

International Search Report and Written Opinion issued on applicant's corresponding PCT application PCT/IB2019/058487 pp. 1-15.

* cited by examiner

INTERFERENCE DETECTION AND AVOIDANCE IN CITIZEN BROADBAND RADIO SERVICE (CBRS)

This application is a 35 U.S.C. § 371 national phase filing of International Application No. PCT/IB2019/058487, filed Oct. 4, 2019, which claims benefit of U.S. patent Application No. 62/741315 filed Oct. 4, 2018, the content of both of which is incorporated herein by reference in its entirety.

TECHNICAL FIELD

The present disclosure relates to wireless networks, and in particular to interference detection and avoidance in Citizen Broadband Radio Service (CBRS).

BACKGROUND

Citizen Broadband Radio Service (CBRS) is currently defined in Part 96 of Title 47, Chapter 1, Subchapter D of the United States Code of Federal Regulations. It is contemplated that successor regulations and technical standards may be defined in the future, and that counterpart services may become available outside the United States. CBRS offers spectrum at 3550-3700 MHz that may be shared with primary federal and commercial incumbents and Mobile Broadband (MBB) users in a novel three-tier approach in the United States of America. The CBRS uses a geolocation database and policy management function known as the Spectrum Access System (SAS) to manage the use of spectrum for MBB users. With such a tiered access, incumbent users (referred to as incumbents here after) are given highest priority to access the spectrum and are protected against interference from other devices/users that are using the CBRS band. Incumbents are federal entities that are primarily authorized to use the spectrum such as navy/military vessel and radar, commercial users that operate under terms available to the Fixed Satellite Service (FSS), or users of the Wireless Broadband Services (WBS) as defined under the FCC rules in 47 CFR part 90, subpart Z of the Code of Federal Regulations in the United States of America. WBS users are typically Wireless Internet Service Provider (WISP), and fixed microwave users operating under light licensing rules and are herewith referred to as grandfathered wireless users (GWU).

Radio transmission equipment operating as base stations that use the CBRS band are referred to as CBRS devices (CBSD). For the main systems under consideration, a CBSD may non-inclusively be an evolved Node B (eNB) as defined for the Long Term Evolution (LTE) standard or gNB as defined by the 3GPP NR standard, base station, access point, fixed microwave equipment or customer-premises equipment that uses the CBRS band. As per federal rules, user equipment or mobile terminal that are being served by CBSDs are referred to as End User Devices (EUD). Incumbents along with GWUs constitute the highest tier of the CBRS ecosystem and are worthy of protection from interference beyond a specified level. A GWU that is registered in the FCC Universal Licensing System is protected for five years within which they must seek to transition to qualify as CBSDs. Whenever incumbents' operations are not being interfered with, as defined in the FCC rules of 47 CFR Part 96, the SAS may authorize spectrum to be used by the lower tiers of the CBRS framework by allowing CBSDs to transmit in either the Priority Access (PA) tier or the General Authorized Access (GAA) tier. When a CBSD has a PA licenses (PAL), it will be protected against interference from other CBSDs authorized for PA or GAA. A GAA user does not generally qualify for any interference protection under the federal rules. However, it is largely recognized that the SAS may assume a role that accords GAA to use the greatest possible protection possible by enabling sharing under terms that are mutually acceptable among participating CBSDs. Such a role may include apportioning spectrum through methods that seek to mitigate interference through a variety of means such as division of spectrum, or interfaces to analysis engines known as co-existence managers (CxM) that seek to introduce more advanced coordination of transmission patterns and synchronization of networks on common timing references. The FCC has decreed that SASs may operate nationwide in a competitive approach to offer service to networks of CBSDs.

Standard development organizations such as the Wireless Innovation Forum (WInnForum) and CBRS Alliance (CBRS-A) are working towards developing standards for protocols, architectures, and operational procedures, required to efficiently access the CBRS spectrum. One of the key operations that they focus on is GAA co-existence, where spectrum (channels) are allocated to GAA CBSDs efficiently by maximizing the throughput of CBSDs that are accessing the CBRS band by determining maximum acceptable levels of interference to each other and incumbents. In doing so, WInnForum focuses on allocating spectrum to groups of CBSDs in a fair manner, assuming each group can manage interference between its members internally. Such a group is referred to as Co-existence Group (CxG) and comprises CBSDs of similar technology—for example, CBSDs that supports LTE may all belong to one CxG. Specifically, CBRS-A is working towards allocating spectrum among CBSDs within a CxG that comprises CBSDs of LTE or NR technology.

For each CxG, a Co-existence Manager (CxM) manages CBSDs, allocating spectrum among the CBSDs belonging to the CxG. While allocating spectrum in both the cases, i.e., among CBSDs within a CxG or among CxGs, the SAS may employ a connected set graph, which represents the CBRS ecosystem that is being managed by the SAS. Such a connected set graph is comprised of vertices, representing CBSDs in the ecosystem, and edge connections, connecting two vertices if the corresponding CBSDs connected by the edge interfere with each other above a defined threshold. Thus, an edge between any two CBSDs exists or equivalently two CBSDs interfere each other, if their coverage areas overlap. Moreover, each edge has an edge-weight which represents the impact of interference between the corresponding CBSDs, such that the larger the interference between two CBSDs, the larger the weight of the edge connecting two vertices representing the CBSDs. While determining edge connections and corresponding edge-weights, the SAS may calculate coverage areas and interference levels based on the reference propagation model and an arbitrary threshold interference level. It removes edges between CBSDs within same network (for CBRS-A), assuming interreference is managed internally within the network. Furthermore, edges within a CxG are removed (for WInnForum), assuming interference is managed internally within CxG. In the case, when there are a large number of edges making the graph intractable, the interference threshold is gradually increased to remove edges until the graph becomes tractable. Finally, the SAS may use an algorithm based on graph-theory to color the vertices representing CBSDs, such that each vertex is assigned a color with no two vertices having an edge between them are assigned with the same color. In this context, a color represents a channel assigned to the corresponding CBSD that the vertex represents. Thus two CBSDs connected by an edge cannot use the same channel at the same time.

Interference can be in the downlink (i.e., transmission from CBSD to EUD) and/or the uplink (i.e., transmission from EUD to CBSD) directions. As such, CBSDs and/or EUDs interfere with each other even if they are not using the same channel, for example due to the signal leakage on the adjacent channels. As illustrated in FIGS. 3A-3D, interference is mainly from CBSD to EUD (FIG. 3A), CBSD to CBSD (FIG. 3C), EUD to CBSD (FIG. 3B) and EUD to EUD (FIG. 3D). To avoid and manage interference, specifically in DL-DL interference, the SAS may construct an accurate graph representing the CBRS ecosystem that it is managing. However, channel fading and propagation variation that all of the transmissions from CBSDs suffer are not necessarily the same. Thus, interference and coverage area calculations based on a reference propagation model that a SAS may use, may not reflect a realistic scenario, which results in a graph with inaccurate edges. Moreover, it is equally important to accurately calculate the corresponding edge weights. Thus, a graph with inaccurate edges and edge weights may jeopardize the GAA co-existence operations and result in unacceptable interference among GAA CBSDs. When such interference occurs, currently there is no mechanism, in either the standard or any contribution that is currently being discussed or proposed, by which a CBSD may report such an incidence to SAS or CxM. Thus, it is necessary to develop and propose a mechanism in the existing CBRS framework that helps to construct a graph with accurate edges and edge-weights and ensures smooth GAA operation. Moreover, a mechanism that enables CBSDs to detect interference, if there is any, and report it to the SAS or CxM is also required in the existing CBRS framework. Note that there are methodologies to determine overlapping coverage areas of the serving cell and one or more neighboring cells that are known, for example, from US patent application publication No. 20150223084A1, which allows a CBSD to determine the overlapping coverage area between CBSDs that are in the same network. In the CBRS, to estimate the edge-connection and corresponding edge-weights, it is required to determine the overlapping coverage areas among CBSDs belonging to different networks. Consequently, the existing method cannot be used.

SUMMARY

An aspect of the present invention provides a network node of a communications network configured to provide Citizen Broadband Radio Service (CBRS) to at least one end user device (EUD) in a coverage area of the network node, the network node comprising at least one processor, and a memory storing software instructions configured to control the at least one processor to perform steps of: detecting interference from at least one aggressor device in the network; and reporting the detected interference to at least one of a Spectrum Access System (SAS) and a co-existence manager (CxM) of the communications network.

The disclosed technique provides mechanisms that are useful for smooth and efficient operations of CBRS in general (with interference detection) as well as for GAA co-existence (with edge determination and edge-weight calculation). With this invention, we present key elements that are essential for GAA co-existence operations to avoid and detect interference in CBRS, which includes:

Roles of entities such as a CBSD and EUD;
Application and analysis of parameters such as RSRP, Signal-to-Interference Ratio (SIR) and the CDF of SIR, with details of how such parameters can be generated;
Methods to:
  collect measurement reports, calculate the SIR from RSRP in measurement reports, and to construct the CDF of SIR;
  detect interference based on measurement reports and CQI reports;
  identify the interfering CBSDs with their unique global identifier upon detecting interference;
  detect edge connections with either all the neighboring CBSDs that are not in its network or potential neighboring CBSDs as identified by the CxM or SAS; and
  determine edge weighs of all the detected edges
The disclosed technique enables a CBSD to
Detect interference from the neighboring CBSDs which do not belong to the same network and identify interfering CBSDs. Furthermore, the victim CBSD prepares a list of interfering CBSDs with their unique global identifier and reports or shares such a list with the SAS, CxM or Radio Access Network (RAN) management system to resolve the problem. Note that the Physical Cell Identifier (PCI) and E-UTRAN Cell Global Identifier (ECGI) may be used if needed as a unique global identifier CBSDs; and
Determine a list of neighboring CBSDs by their unique global identifiers with which it has edges and corresponding edge-weight values (if any).
Furthermore, such a list is reported to the SAS and/or CxM to assist in constructing a graph with more accurate edges and edge-weights, which is essential for an efficient utilization of CBRS band.

Embodiments of a base station, communication system, and a method in a communication system are also disclosed.

BRIEF DESCRIPTION OF THE DRAWINGS

The accompanying Figures incorporated in and forming a part of this specification illustrate several aspects of the disclosure, and together with the description serve to explain principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 1:
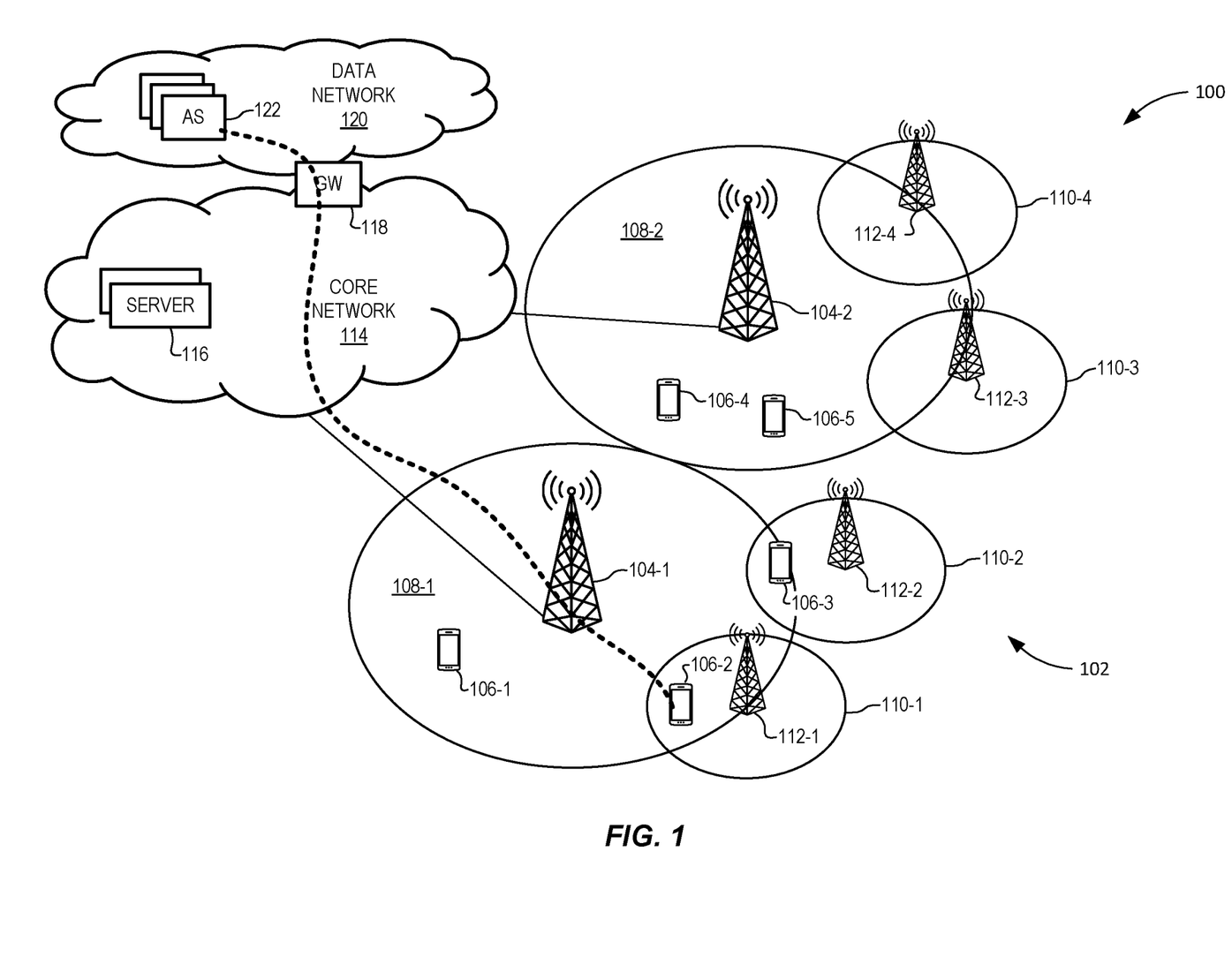
FIG. 1 is a block diagram schematically illustrating a representative network in which embodiments of the present invention may be deployed.

FIG. 1 illustrates one example of a cellular communications network 100 in which embodiments of the present disclosure may be implemented. In the embodiments described herein, the cellular communications network 100 is a Public Land Mobility Network (PLMN) conforming to one or more of the LTE, 3G, 4G and 5G NR standards, or their successors. In the illustrated example, the cellular communications network 100 includes a (Radio) Access Network ((R)AN) 102 comprising base stations 104-1 and 104-2 controlling radio communications with wireless devices 106-1, 106-2, 106-3, 106-4, 106-5 within corresponding macro cells 108-1 and 108-2. Each macro cell 108 may be defined by any suitable combination of geography, frequency, Radio Access Technology (RAT) and modulation scheme.

Base stations 104 can be any type of network access device capable of establishing radio connection(s) with one or more wireless devices 106 within a respective coverage area of the base station 104 or low power node 112, and further configured to forward subscriber traffic between the core network 114 and the one or more wireless devices 106. An important feature of a base station 104 is that it is configured with both a radio interface configured to send and receive radio signals to and from a wireless device 106, and a network interface configured to exchange electronic and/or optical signals with the core network 114. Examples of base stations 104 and low power nodes 112 include: Evolved Node B (eNB) systems (known, for example, in the 3GPP standards): WiFi access points (known, for example from IEEE 802.11 standards) or the like. In some contexts, a base station 104 may be referred to as an access point (AP) regardless of the Radio Access Technology (RAT) that it supports. A base station 104 configured to use the Citizen Broadband Radio Service (CBRS) band (e.g. 3550-3700 MHz) may be referred to as a CBRS device (CBSD).

The illustrated (R)AN 102 also includes small cells 110-1 through 110-4, within which radio communication can be controlled by corresponding low power nodes 112-1 through 112-4. As with the macro cells 108, each small cell may be defined by any suitable combination of geography, frequency, Radio Access Technology (RAT) and modulation scheme. As with the base stations 104, a low power node 112 can be any type of network access device capable of establishing radio connection(s) with one or more wireless devices 106 within a respective coverage area of the low power node 112, and further configured to forward subscriber traffic between the core network 114 and the one or more wireless devices 106. An important feature of a low power node 112 is that it is configured with both a radio interface configured to send and receive radio signals to and from a wireless device 106, and a network interface configured to exchange electronic and/or optical signals with the core network 114. In some embodiments, a low power node 112 may be connected to the core network 114 by a direct connection, such as an optical cable. In other embodiments, a low power node 112 may be connected to the core network 114 by an indirect connection, such as via a radio or optical fiber link to a base station 104. Examples of low power nodes 112 include: Remote Radio Heads (RRHs) connected to a base station or a network router (not shown): WiFi access points or the like. In some contexts, a low power node 112 may be referred to as an access point (AP) regardless of the specific Radio Access Technology (RAT) that it supports. A low power node 112 configured to use the Citizen Broadband Radio Service (CBRS) band (e.g. 3550-3700 MHz) may also be referred to as a CBRS device (CBSD).

Notably, while not illustrated, a particular small cell 110 may alternatively be controlled by a base station 104, for example using a beam-forming technique. In such cases, the particular small cell 110 may not be associated with a respective low power node 112 per se. Rather, the particular small cell 110 may be associated with a respective set of parameters implemented in the base station 104. In this disclosure, the term "cell" is used to refer to a defined combination of parameters (such as geography, frequency, Radio Access Technology (RAT), modulation scheme, identifiers and the like) that can be used by a wireless device 106 to access communication services of the network 100. The term "cell" does not imply any particular parameter values, or any particular physical configuration of devices needed to enable a wireless device 106 to access those communication services.

Wireless devices 106 can be any type of device capable of sending and receiving radio signals to and from a base station 104 and/or low power node 112. Examples of wireless device 106 include cellular phones, Personal Data Assistants (PDAs), mobile computers, Internet of Things (IoT) devices, autonomous vehicle controllers, and the like. In some contexts, a wireless device 106 may be referred to as a User Equipment (UE), and End User Device (EUD) or a mobile device.

In some embodiments, the macro cells 108-1 and 108-2 may overlap each other, and may also overlap one or more small cells 110. For example, a particular macro cell 108-1 may be one macro cell 108 among a plurality of macro cells covering a common geographical region and having a common RAT and modulation scheme, but using respective different frequencies and/or AP identifiers. In such cases, a wireless device 106 located within a region covered by two or more overlapping cells 108, 112 may send and receive radio signals to and from each of the corresponding base stations 104 and/or low power nodes 112.

In the illustrated example, the (R)AN 102 is connected to a Core Network (CN) 114, which may also be referred to as Evolved Core Network (ECN) or Evolved Packet Core (EPC). The CN 114 includes (or, equivalently, is connected to) one or more servers 116 configured to provide networking services such as, for example, Network Functions (NFs) described in 3GPP TS 23.501 V15.2.0 (2018-06) "System Architecture for the 5G System" and its successors. The CN 114 also includes one or more gateway (GW) nodes 118 configured to connect the CN 114 to a packet data network (DN) 120 such as, for example, the internet. A gateway node 118 may be referred to as a packet gateway (PGW) and/or a serving gateway (SGW). The DN 120 may provide communications services to support end-to-end communications between wireless devices 106 and one or more application servers (ASs) 122 configured to exchange data packet flows with the wireless devices 106 via the CN 114 and (R)AN 102. In some contexts, an application server (AS) 122 may also be referred to as a host server.

In some contexts, an end-to-end signal path between an AS 122 and one or more wireless devices 106 may be referred to as an Over-The-Top (OTT) connection. Similarly, a communication service that employs signal transmission between an AS 122 and one or more wireless devices 106 may be referred to as an OTT service.

It should be appreciated that the separation between the CN 114 and the DN 120 can be purely logical, in order to simplify understanding of their respective roles. In particular, the CN 114 is primarily focused on providing wireless device access services and supporting wireless device mobility. On the other hand, the DN 120 is primarily focused on providing end-to-end communications, particularly across network domains. However, it will be appreciated that both the CN 114 and the DN 120 can be implemented on common physical network infrastructure, if desired.

Figure 2A:
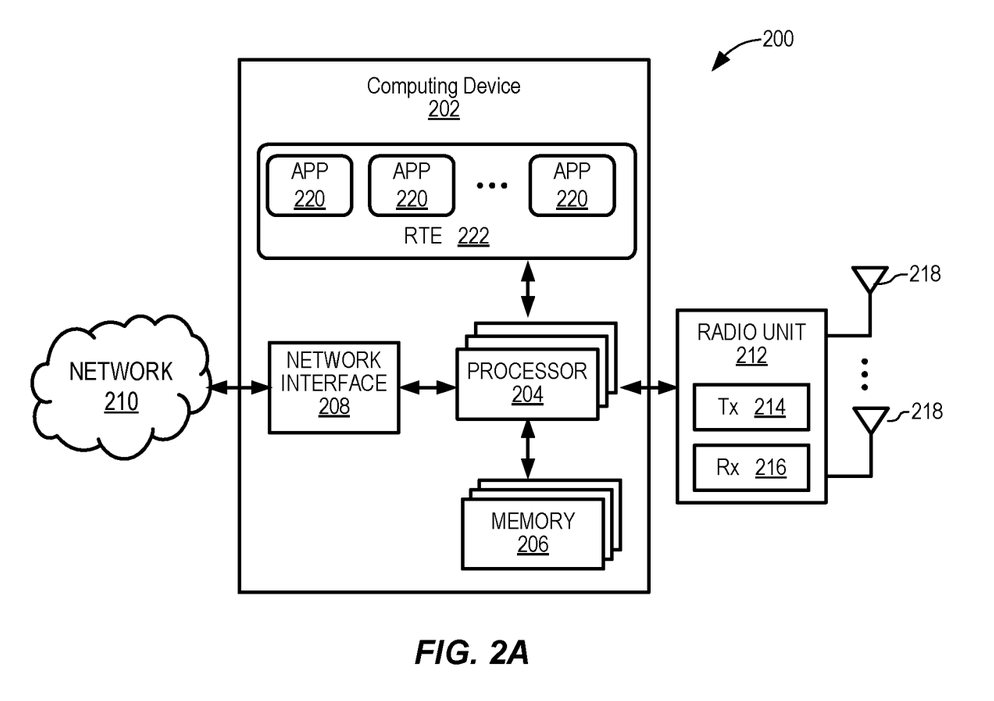
FIGS. 2A and 2B are block diagrams schematically illustrating examples of a computing device usable in embodiments of the present invention.
Figure 2B:
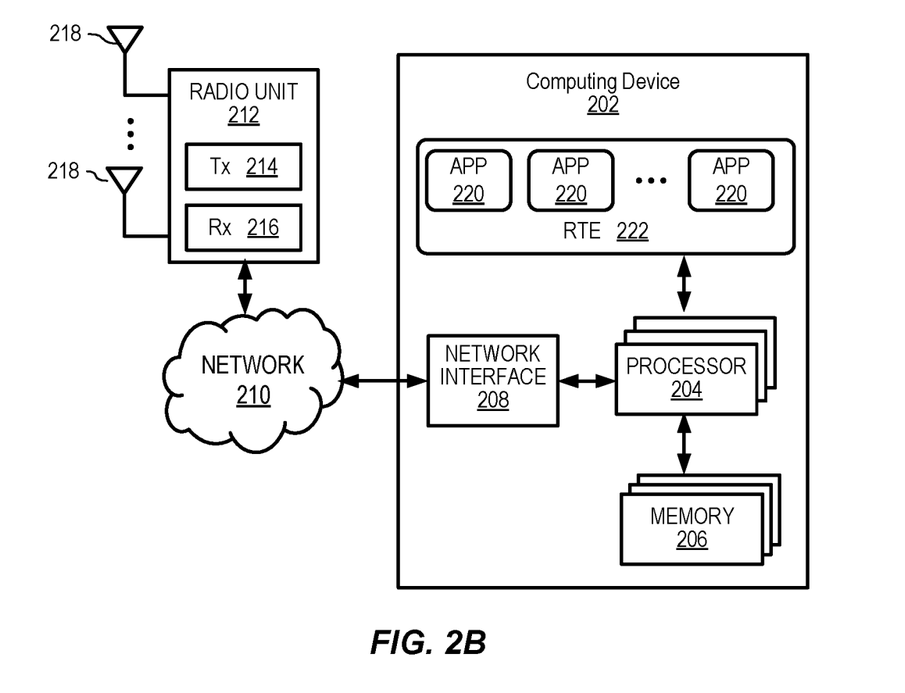

FIGS. 2A and 2B are block diagrams schematically illustrating a communications system 200 including a computing device 202 usable in embodiments of the present invention. In various embodiments, any or all of the base stations 104 or 112, wireless devices 106, core network servers 116 or gateways 118 and data network servers 122 may be implemented using systems and principles in accordance with the computing device 202. It may also be appreciated that any or all of the elements of the network 100 may be virtualized using techniques known in the art or developed in the future, in which case the functions of any or all the base stations 104 or 112, core network servers 116 or gateways 118, and/or any or all network functions of the RAN 102, CN 114 and DN 120 may be implemented by suitable software executing within a computing device 202 or within a data center (non shown) composed of multiple computing devices 202.

In the example of FIG. 2A, the communications system 200 generally includes computing device 202 connected to one or more networks 210 and one or more radio units 212. The computing device 202 includes one or more processors 204, a memory 206, one or more network interfaces 208. The processors 204 may be provided as any suitable combination of Central Processing Units (CPUs), Application Specific Integrated Circuits (ASICs), Field Programmable Gate Arrays (FPGAs), or the like. Similarly, the memory 206 may be provided as any suitable combination of Random Access Memory (RAM), Read Only Memory (ROM) and mass storage technologies such as magnetic or optical disc storage or the like. The network interfaces 208 enable signaling between the computing device 200 and the networks 210, such as the Core Network 114, the data network 120, or a private domain network such as a data center (not shown).

Each radio unit 212 typically includes at least one transmitter (Tx) 214 and at least one receiver (Rx) 216 coupled to one or more antennas 218. In the example of FIG. 2A, the radio unit(s) 212 is(are) shown as being external to the computing device 202 and connected to the computing device 202 via a suitable physical connection (such as a copper cable or an optical cable). In the example of FIG. 2B, the radio unit(s) 212 is(are) shown as being connected to computing device 202 via the network 210 and the network interface 208. In still other embodiments, the radio unit(s) 212 and optionally also the antenna(s) 218 may be integrated together with the computing device 202.

The one or more processors 204 operate to provide functions of the computing device 202. Typically, these function(s) are implemented as software applications (APPs) or modules 220 stored in the memory 206, for example, and executed by the one or more processors 204. In some embodiments, one or more software applications or modules 220 may execute within a secure run-time environment (RTE) 222 maintained by an operating system (not shown) of the computing device 202.

It may be appreciated that specific embodiments may exclude one or more of the elements illustrated in FIGS. 2A and 2B. For example, a computing device 202 configured to implement a wireless device 106 may incorporate one or more processors 204, a memory 206, and one or more radio units 212, but may exclude a network interface 208 and associated connections through the network 210. Conversely, a computing device 202 configured to implement a server 116 or 122 may include one or more processors 204, a memory 206, and one or more network interfaces 208, but may exclude radio units 212. A computing device 302 configured to implement a base station 104 or 112, on the other hand, will normally include one or more processors 204, a memory 206, and both radio units 212 and network interfaces 208.

FIGS. 3A-3D illustrate respective scenarios of interference between devices in a Citizen Broadband Radio Service (CBRS) system. In these figures, desired signals are indicated in solid arrows, while interference signals are indicated by dashed arrows. The device(s) receiving an interference signal, and CBRSs affected by that interference signal are referred to as "victims", while the source of an interference signal is referred to as an "aggressor".

Figure 3A:
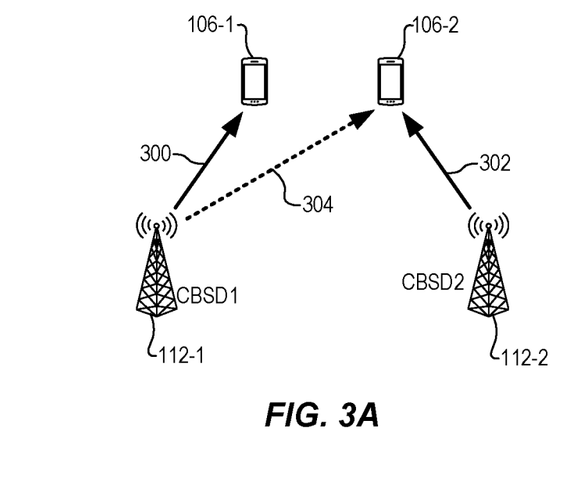
FIGS. 3A-3D are block diagrams schematically illustrating examples scenarios of interference in CBRS communications.

FIG. 3A illustrates a DL-to-DL scenario in which two CBSDs 112-1 and 112-2 transmit desired downlink (DL) signals 300 and 302 to respective different EUDs 106-1 and 106-2. In the illustrated scenario, the signal transmitted from CDSD1 112-1 to EUD1 106-1, is also received, as an interference signal 304, by EUD2 106-2. Accordingly, in this scenario, CDSB1 112-1 is considered to be an "aggressor", while EUD2 and CDSD2 112-2 are considered to be "victims".

Figure 3B:
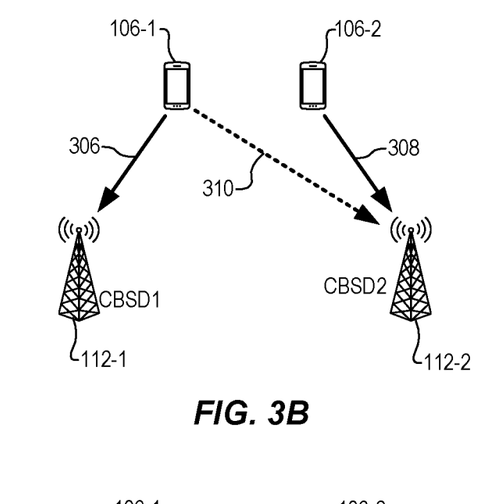

FIG. 3B illustrates a UL-to-UL scenario in which two EUDs 106-1 and 106-2 transmit desired uplink (UL) signals 306 and 308 to respective different CBSDs 112-1 and 112-2. In the illustrated scenario, the UL signal 306 transmitted from EUD1 106-1 to CDSD1 112-1, is also received, as an interference signal 310, by CBSD2 112-2. Accordingly, in this scenario, EUD1 106-1 is considered to be an "aggressor", while EUD2 and CDSD2 112-2 are considered to be "victims".

Figure 3C:
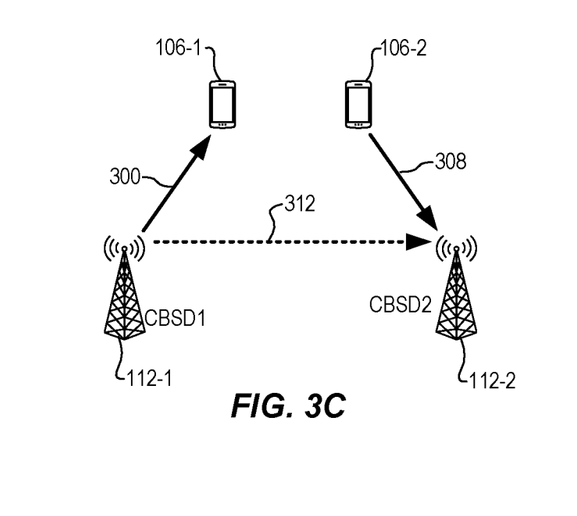
Figure 3D:
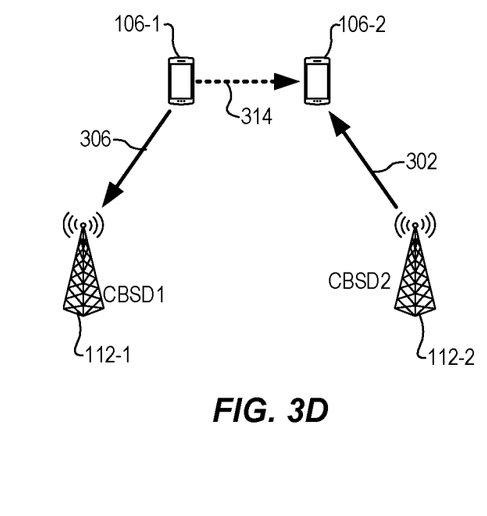

FIG. 3C illustrates a DL-to-UL scenario in which CBSD1 112-1 transmits a desired DL signal 300 to EUD1 106-1, while EUD2 106-2 transmits a desired UL signal 308 to CBSD2 112-2. In the illustrated scenario, the DL signal 300 transmitted from CDSD1 112-1 to EUD1 106-1 is also received, as an interference signal 312, by CBSD2 112-2. Accordingly, in this scenario, CDSD1 112-1 is considered to be an "aggressor", while CDSD2 112-2 and EUD2 are considered to be "victims".

FIG. 3D illustrates a UL-to-DL scenario in which EUD1 106-1 transmits a desired UL signal 306 to CBSD1 112-1, while CBSD2 112-2 transmits a desired DL signal 302 to EUD2 106-2. In the illustrated scenario, the UL signal 306 transmitted from EUD1 106-1 to CDSD1 112-1 is also received, as an interference signal 314, by EUD2 106-2. Accordingly, in this scenario, EUD1 106-1 is considered to be an "aggressor", while EUD2 and CDSD2 112-2 are considered to be "victims".

Title 47, Chapter 1, Subchapter D, Part 96 of the US Code of Federal Regulations only covers the scenario of FIG. 3A: DL-to-DL Part 96.41(d) covers co-channel interference
Part 96.41(f) covers adjacent channel and in-channel blocking interference
Winn Forum has currently not addressed Part 96.41(f)
There is no UL protection defined in Part 96
The scenarios of FIGS. 3C and 3D may happen only when the DL/UL cycles are not synchronized between CBSDs, typically when CBSDs use different technologies.

A SAS may only be able to estimate and control the scenarios of FIGS. 3A and 3C, where interference is generated by CBSDs.

Systems and methods are disclosed herein that provide a mechanism which enables a CBSD to detect the occurrence of interference, and further to identify a list of interfering CBSDs that are operating in the serving channel (co-channel) as the victim CBSD or K adjacent channels on the either side of the serving channel. Also, the disclosed technique provides systems and mechanisms which enable a CBSD to estimate the existence of edge connections with its neighboring CBSDs through measurements, instead of simply relying on the propagation model implemented in the SAS/CxM. In doing so, the invention optionally also allows the CBSD or associated analysis function to isolate only those neighboring CBSDs that are members of networks which is not part of the network of the serving CBSD. Consequently, the edge connection and corresponding edge-weights estimated with the help of measurements are more accurate than that of the ones based on the propagation model. Thus, a SAS may be able to construct a more accurate graph, when CBSDs report their estimation on edge connections and edge-weights, which is essential for GAA co-existence operations.

To estimate an edge connection with its neighbors, a CBSD may simply use the received signal power values that it collects from measurement reports from its EUDs. Alternatively, it may estimate the signal-to-interference ratio (SIR) with the help of measurement reports from its EUDs, as if the neighbor is on the same channel as the operating cell. This provides an estimate of the interference if the neighbor were to share a channel with the operating cell. Based on estimated SIR samples, the CBSD estimates the existence of an edge-connection with its neighboring CBSD. If there exists an edge connection, CBSD determines the edge-weight based on the number of EUDs that are affected by interference from the corresponding neighboring CBSD. The CBSD prepares a list that consists of unique global identifiers of neighboring CBSDs with which it has edge connections. The list also consists of the corresponding edge-weights. The disclosed techniques are based on measurement of downlink (DL) received power. A serving CBSD collects DL received power of a reference symbol reported by EUDs that are being served by it.

The reference signal received power (RSRP) defined in 3GPP standards for LTE systems, is a preferred representation of the required measurement of the received signal power. In a simple implementation, the serving CBSD compares the neighboring cell's RSRP against a threshold value and estimates the edge connection. Furthermore, the serving CBSD could estimate SIR with its neighboring CBSD by calculating the ratio of serving cell's RSRP to the corresponding neighboring cell's RSRP reported by an EUD, preferably measured simultaneously in time. Alternatively, instead of RSRP, the CBSD may use other parameters based on DL received power of the reference signal such as reference signal received quality (RSRQ), reference signal's signal to interference plus noise ratio (RS-SINR), channel state information-reference signal (CSI-RS) and either directly compare them with a threshold value or calculate the ratio which is equivalent to SIR (for applicable parameters) for the purposes of the present disclosure. Without the loss of generality, In the following description we use RSRP to describe the disclosed techniques based on downlink received power.

In the techniques disclosed herein, prior to taking measurements, the CBSD (also known as the serving CBSD that seeks to determine the edge connection and interference) instructs/configures the EUD to report the RSRP of the transmission from the CBSD itself as well as the RSRP of the transmissions from one or more neighboring CBSDs that are operating on the same or different channels as serving channel. The serving CBSD may use the RSRP samples in in accordance with different algorithms. Example algorithms include processes for: detection of interference; and creation of a graph. The main steps in each of these example algorithms are described separately below.

Algorithm 1: Interference Detection

Figure 4:
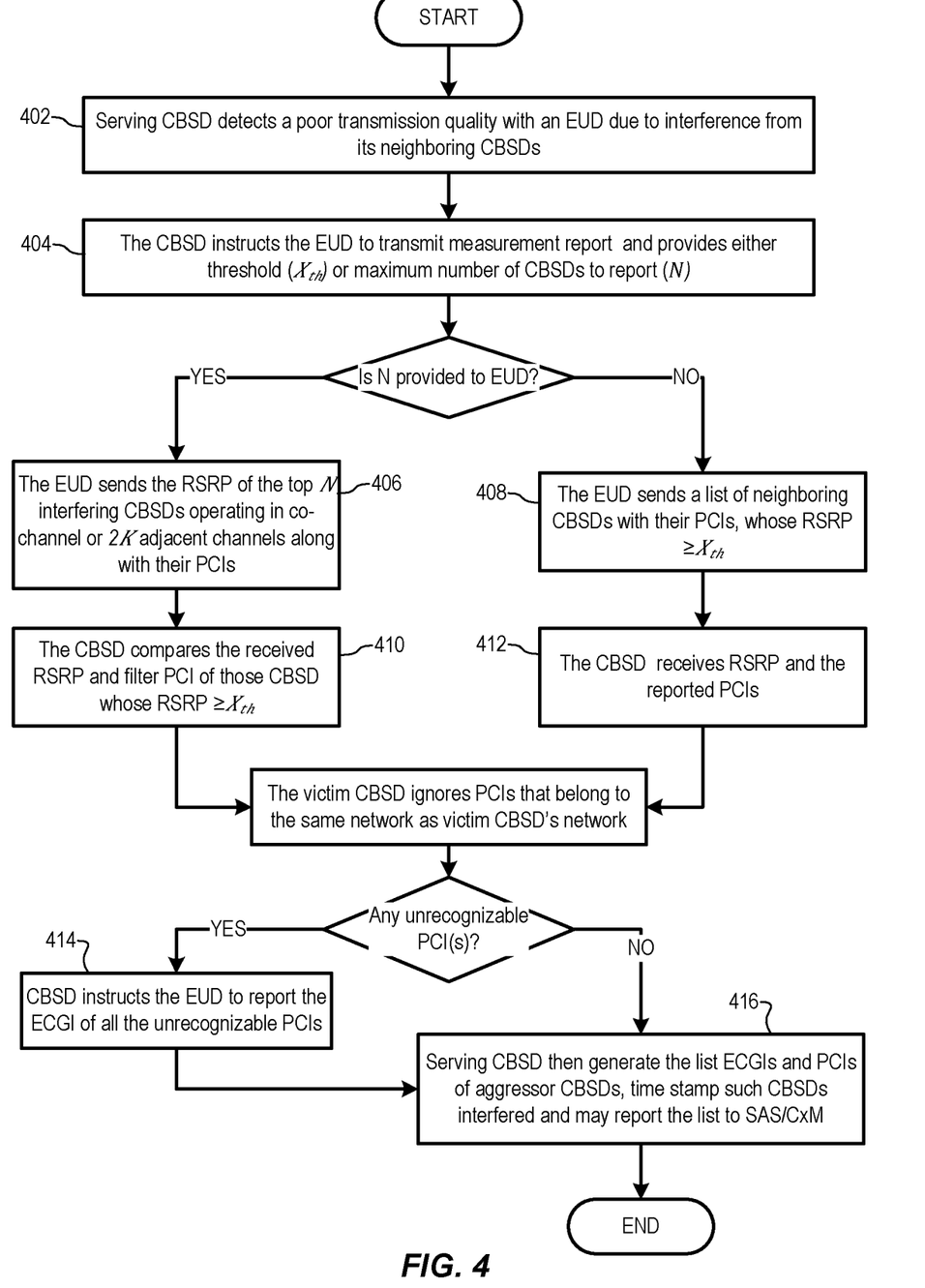
FIG. 4 is a flow chart illustrating a representative process in accordance with an embodiment of the present invention.

FIG. 4 is a flowchart illustrating the principle steps in a process for interference detection in accordance with an example embodiment. An EUD sends a report to its serving CBSD that indicates the communication quality of the transmission channel, for example an EUD sends a channel quality indicator (CQI) to indicate the current communication channel quality in LTE system. Thus, when an EUD that is being served by a CBSD suffers from interference from neighboring CBSDs (referred to as aggressor CBSDs), the serving CBSD receives a poor CQI estimate from the EUD. To avoid reporting any unnecessary interfering instances, a victim CBSD may ignore some, all or none of the EUDs that are:

- being interfered by the neighboring CBSDs that are in the same network of the serving CBSD (escalated to the handover routine);
- at the cell edge bordering one or more neighboring cells. The CBSD may implement a method that is used for handover calculation which compares RSRPs of serving and neighboring cells to identify the EUDs on the cell edge;
- reporting poor SINR during a peak hour or special geographic location defined by the operator when the temporal interference is normal, such as during morning and evening rush-hour, or high-human density scenarios such as in sports stadiums and concert venues.

After considering these interference scenarios (if applicable), if the serving CBSD finds that the EUDs are suffering from an unacceptable poor performance (based on CQI below a defined threshold, say $CQI_{th}$), it instructs the affected EUDs to send a measurement report that includes the downlink signal to interference and noise ratio (SINR). It is noted that in an LTE system a EUD may send an RSRQ response which indicates the downlink SINR. If the reported RSRQ indicated the EUDs are being interfered from the neighboring CBSDs (aggressor CBSDs) above an interference threshold $I_{th}$, the following the steps may be taken:

Step 1: Interference detection test: Upon receiving (at 402) an indication of poor SINR at an EUD (i.e., such as a CQI report based on an RSRQ measurement of the desired downlink signal), the victim CBSD instructs (at 404) the EUD in consideration to send a measurement report that includes the downlink received power (or RSRP) from the aggressor CBSDs and their unique identifier—in an LTE system a EUD may be capable of detecting PCI from other base stations that are operating in any channels indicated by the serving base station. Such a measurement report from the EUD may vary based on one of the cases as described below:

Case 1: Upon receiving a measurement instruction, the EUD sends a measurement report (at 406) to the serving CBSD that consists of a list which includes (a) identifiers of top N (=3, nominally) CBSDs (that are operating in the serving channels and up to K adjacent channels that are on either side of the serving channels (i.e., a total of 2K+1 channels) with respect to the serving CBSD; and (b) the RSRP values from the cell using corresponding 2K+1 channels.

Case 2: While sending the measurement instruction, the serving CBSD may send a threshold RSRP value (say $X_{th}$). Upon receiving such an instruction with threshold RSRP, the EUD sends a measurement report to the CBSD that consists of a list of (a) identifier of CBSDs that are operating in the same and K adjacent channels on the either side of the serving channel whose RSRP is not less than $X_{th}$; and (b) corresponding RSRP value.

It should be noted that with K=1, the EUD measures the serving channel and the two immediate adjacent channels of the serving channel. Also, the serving CBSD can instruct its EUDs to measure any channel(s) in the CBRS band to determine the interfering CBSD(s). Furthermore, in either of these cases, the source of interference may be unidentifiable, as the air interface used by the CBSD may not allow identification of individual signals. Under such circumstances, the list of CBSD identifiers may be appended by a placeholder for a default residual interferer that sums up all the residual energy from noise sources that are unaccounted for. In case 2, the residual energy would obviously only be included if the estimate exceeds the supplied threshold. For both of the above cases, if the number of adjacent channels on either side of serving channels is less than K, the EUD performs measurement on all the channels in the corresponding side (i.e., K is the maximum number of adjacent channels that EUD may perform measurement as long as the channels exist).

Step 2: Analysis of RSRP: Upon receiving the measurement report from the EUD, the serving CBSD analyzes the measurement report based on the cases as described in Step 1

Case 1: The serving CBSD compares (at 410) the RSRP that it received from the EUD with the threshold RSRP value, $X_{th}$, and identifies those neighboring CBSDs as aggressors whose RSRP is not less than $X_{th}$.

Case 2: As all the CBSDs reported in the received measurement interferes with the service cell (as their RSRP is greater than threshold $X_{th}$), the serving CBSD identifies (at 412) all the CBSDs reported in measurement report as aggressor CBSDs.

Step 3: Determining identifiers of aggressor CBSDs: The serving CBSD then tries to identify PCIs of all the aggressor CBSDs which belong to the different network. If it recognizes certain PCIs, it determines a global unique identifier of the corresponding CBSDs. In an LTE system the EUTRAN Cell Global Identifier (ECGI) serves this purpose. If a PCI is not recognizable or for a scenario in which there is a PCI conflict between CBSDs from two different networks/operators, the EUD (at 414) makes a best effort to identify the ECGI of at least one interferer (interference signal source), or alternatively adds the measured interference to the residual interference power for the unidentifiable interferer class.

Step 4: Gathering data on possible aggressor CBSDs over time and analyzing data: Data is gathered from possible aggressor CBSDs over an observation period from multiple EUDs. Data on the number of EUDs impacted as a fraction of total EUDs served, as well as data on the severity of interference of those EUDs in terms of the estimated SIR in the observation period can be used to determine the severity of the potential aggressor CBSD. This analysis may include filtering EUDs based on their location (cell edge), time and location that they collected data (during rush hour and high-human density location) as described previously in this section. The analysis can determine whether one or more aggressor CBSDs have a significant impact on operation (i.e., are dominant) and warrant an interference report to be sent to the SAS/CxM.

Step 5: Interference report: Upon detecting interference from the neighboring CBSDs, a victim CBSD sends an interference report (at 416). On doing so, the victim CBSD generates a list of interfering CBSDs that belong to different networks and from which it is being interfered, identifying them by their global unique identifiers. In a case when the source of interference is unidentifiable, the victim CBSD append a placeholder for a default residual interferer instead of the identifier of the interfering in the list. The CBSD prepares an interference report that includes the list, such that the victim CBSD:

may rank the aggressor CBSDs in order while sending the interference report. Such a ranking can be made by using a selected metric to indicate the level of interference such as the number of interfered instances, number of interfered EUDs, etc.;

may include the time stamps and/or duration during when it was being interfered, and the number of EUDs that are affected by the respective aggressor CBSDs.

The victim CBSD may then:

send the interference report to SAS/CxM. Furthermore, it may send the interference report to the RAN management system. The RAN management system of the serving CBSD may contact the RAN management system(s) of the aggressor CBSD and negotiate a possible solution to resolve the interference problem. In doing so, the serving RAN management system may request assistance from the SAS to identify the owner of the other RAN system and to receive other necessary information; and send the collected measurements to a network management system that may include a Self-Organizing Network (SoN) function that includes spectrum management functionality which interacts with a domain proxy interfacing CBSDs to the SAS. The domain proxy then generates heartbeat messages for each CBSD with corresponding interference reports.

It is to be noted that the required threshold values, such as $CQ1_{th}$, $X_{th}$, $I_{th}$ etc., for the disclosed technique may be either provided by the CxM or decided by CBSD itself.

Algorithm 2: Graph Creation

The creation of a graph involves estimating edge connections and respective edge-weights. For this purpose, a serving CBSD may use RSRP (or any other parameter that is indicative of DL received power of a received signal) and compares the measurement of RSRP with a threshold value to determine an edge connection. Alternatively, it estimates the signal-to-interference ratio (SIR) between the operational channel as received by the EUD and the channel from a neighboring CBSD which is not a part of the serving cell network (i.e., a CBSD which is part of another operator's network)—SIR for a given neighboring CBSD is defined as the ratio of serving cell's RSRP to neighboring cell's RSRP which may reside on a different, non-overlapping channel. It may be noted that the SIR with respect to a non-overlapping channel may be calculated in two different ways: (a) by taking the ratio of the RSRPs of the serving channel with the RSRP of the interferer, and (b) according to an estimate of the actual interference within the serving channel's bandwidth. This may be done by modifying the RSRP of the interferer by subtracting the Adjacent Channel Interference Ratio (ACIR) equivalent of the signal in dB. The ACIR may nominally be equated to the Adjacent Channel Leakage Power Ratio (ACLR) in the case of adjacent channels and may otherwise be determined by integrating the corresponding spectral mask over the operating signal bandwidth for alternate channels after accounting for the appropriate frequency separation.

Defining the quantity in (a) as the Potential SIR (PSIR), representing the SIR that may be expected with respect to that interferer if the serving channel were shifted to operate on the same frequency assignment as the identified interferer, and the quantity in (b) as the Actual SIR (ASIR), representing the SIR that is being experienced with respect to the identified interferer on the operating channel. These PSIR and ASIR estimates are used to determine the potential interference even if the serving CBSD and neighboring CBSD operate under the same (or different) channels under corresponding scenarios. They are in turn used to construct cumulative distributed functions (CDF) of PSIR and/or ASIR from the neighboring CBSD in consideration (one or two corresponding CDFs for one potential interferer). In doing so, the serving CBSD takes one of the following approaches:

Case 1: The serving CBSD collects RSRP (serving cell and neighboring cells),and may estimate SIR for corresponding neighboring cells that do not belong to the same network, and constructs the CDF of SIR of respective neighboring CBSDs. Accordingly, the serving CBSD instructs EUDs to measure and report the RSRP from all the neighboring CBSDs.

Case 2: The serving CBSD receives the list of CBSDs (identified by their unique global identifiers such as ECGI) from the SAS/CxM. Thus, the serving CBSD collects RSRP samples from its EUDs, estimates the corresponding SIR values, and constructs separate CDFs for each neighboring CBSDs which are in the list provided by SAS/CxM. Accordingly, the serving CBSD instructs its EUDs to measure and report RSRP from only the listed CBSDs.

Case 3: The serving CBSD receives an instruction from SAS/CxM to perform measurements. It then configures EUDs that it is serving and starts collecting RSRP samples of its own transmissions and transmissions from neighboring cells that do not belong to the same network. Accordingly, if SIR is used as a decision parameter, it estimates SIR with the corresponding neighboring cells and constructs the CDF of the SIR for respective neighboring CBSDs individually.

To avoid collecting a large number RSRP samples as well as constructing a large number of CDFs unnecessarily, a serving CBSD may filter collected or estimated samples. In doing so, all or some or none of the following steps are adopted such that, the CBSD may instruct or configure its EUDs to not report RSRP from the neighboring CBSDs that are in the same network of the serving CBSD (this restriction is only applicable for the disclosed technique, i.e., estimation of edge connections. For other operations such as mobility management, the CBSDs do not adhere to this restriction and may instruct their EUDs to measure RSRP from other CBSDs that belong to same network);

ignore the EUDs that are expected to suffer from interference, such as during rush hours, as such a measurement does not report the normal scenario;

ignore the measurement from CBSDs with low RSRP (below a defined threshold level) from the serving cell, assuming that they are from EUDs at the cell edge. If the reported RSRQ from the serving cell exceeds a certain threshold value, which is the indication that the interference is tolerable from neighboring cells, the low RSRP samples are not ignored;

not construct the CDF of SIR if the number of EUDs reporting the RSRP measurement is less than a threshold number, which is enough to construct a CDF;

not construct the CDF of SIR if the number of estimated SIR samples is less than a threshold number, which is enough to construct a CDF (i.e., thus the CDF for a neighbor is constructed only if the number of estimated SIR samples is enough).

Figure 6:
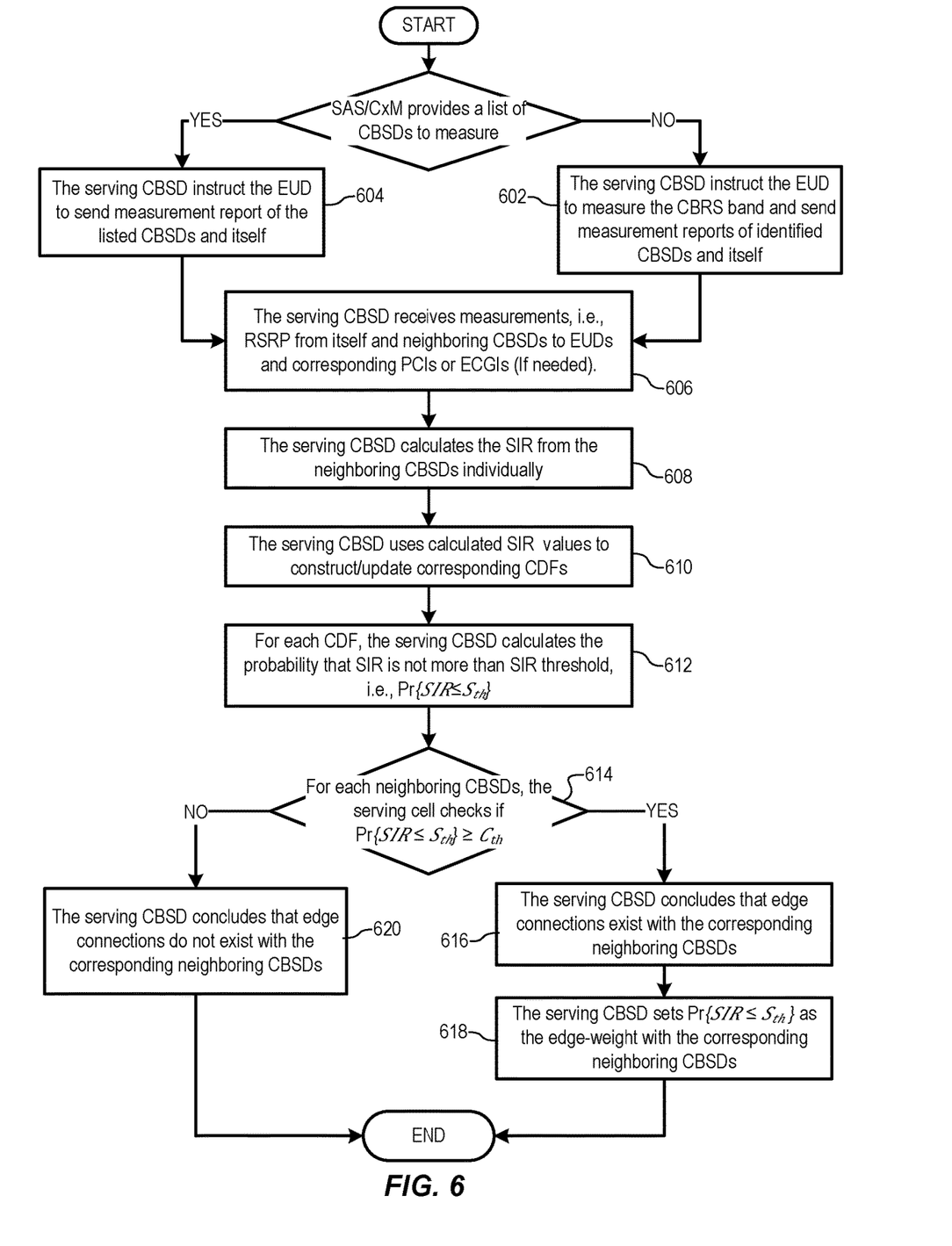
FIG. 6 is a flow chart illustrating a representative process in accordance with another embodiment of the present invention.

The steps that are involved in the proposed edge detection and edge-weight determination are described in detail below with reference to FIG. 6:

Step 1: Configuring EUDs to send a measurement report: A serving CBSD configures or instructs (at 602) EUDs that it is serving to send a measurement report that consists of DL received power (such as RSRP) from itself as well as the top N neighboring CBSDs that the EUDs can reliably detect. Alternatively, the CBSD may configure or instruct (at 604) the EUDs that it is serving to send a measurement report that consists of DL received power (such as RSRP) from itself as well as an identified set of neighboring CBSDs. Upon receiving such instructions, the EUDs measure and report the respective RSRPs.

Step 2: Collection of measurement samples (at 606): CBSD may select some or all EUDs and instruct to them to send measurement reports. Furthermore, the CBSD may choose to send a measurement instruction periodically or aperiodically at a suitable time, such as during off-peak hours when the traffic load is not heavy or anytime that CBSD may wish to gather measurement. Note that the serving CBSD may randomly select a set of EUDs and instruct them to send a measurement report. It is not necessary that the CBSD always instructs the same set of EUDs to send a measurement report. The CBSD collects the RSRP samples from EUDs for an appropriate interval of time, say $T_m$, which may be an hour or a portion of a day representing a number of busy hour periods and slack periods. In Cases 1 and 3 above, the CBSD may request its EUDs to report the ECGI of the neighboring CBSDs, if the reported Pas are not recognizable or for a scenario in which there is a PCI conflict between CBSDs from two different networks/operators (as in Step 3 above).

Note that, if a CBSD is using only RSRP to estimate the edge connection, it only instructs EUDs to measure and report RSRP from neighboring cells. In such a case, it ignores the next step (Step 3). In the following steps (Steps 4 and 5), the calculated SIR value may be replaced with collected RSRP samples when RSRP from a neighboring cell is used to estimate an edge connection.

Step 3: Calculation of Signal-to-Interference Ratio: The serving CBSD then calculates (at 608) the SIR from each neighboring CBSDs, which is expressed in terms of either a pure number (ratio) or decibel (dB). The term SIR is henceforth used to refer to either of PSIR and/or ASIR.

Step 4: Construction of Cumulative Distribution Function (CDF): The CBSD constructs (at 610) a CDF of the calculated SIR for each identified neighboring CBSD individually. The CBSD may construct such a CDF as soon as it calculates the first SIR or after calculating enough SIR samples (which is determined by a predefined number, say M), for a given neighboring CBSD. Once a CDF is constructed, the CBSD updates the CDF as it receives further measurement reports (and calculates the SIR).

Figure 5:
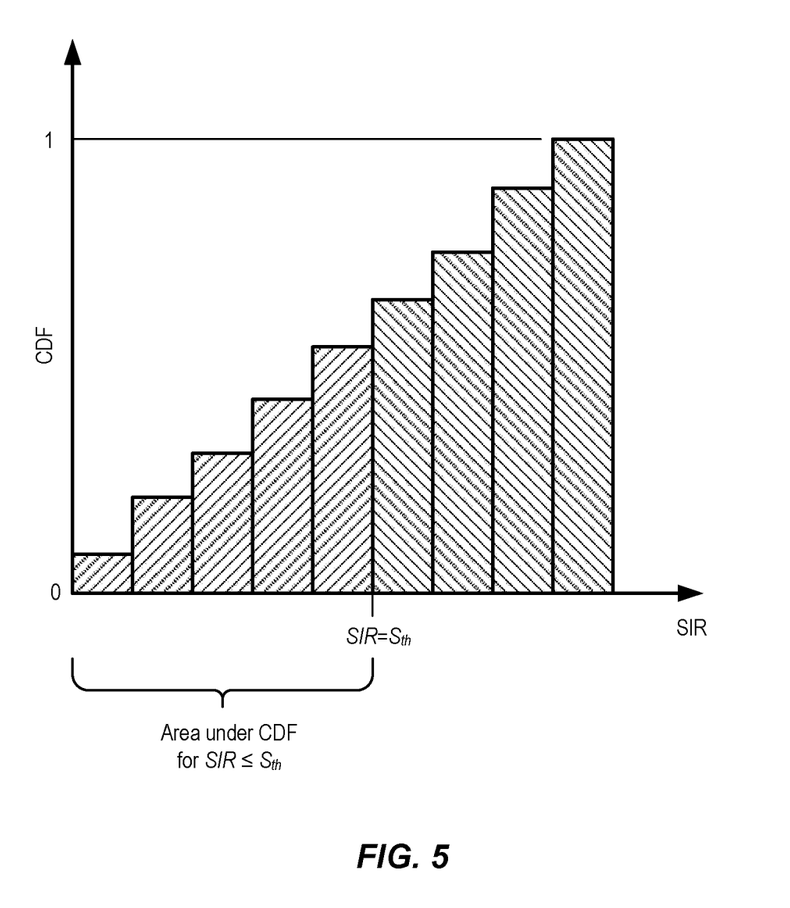
FIG. 5 is a chart illustrating an example relationship between CDF and SIR in the example embodiment of FIG. 6.

Step 5: Determination of edge connection and edge weight: The CBSD determines the existence of edge connections with the help of predefined threshold values such as threshold SIR, denoted as $S_{th}$, and a cut-off threshold, denoted as $C_{th}$. For a CDF, it calculates (at 612) the probability that the SIR is not more than the SIR threshold value, which is equivalent to the area under the CDF curve that is left of SIR=$S_{th}$, as illustrated in FIG. 5. It concludes (616) that an edge connection exists with the corresponding neighboring CBSD if (at 614) the calculated probability value is more than or equal to the cut-off threshold ($C_{th}$). Mathematically, a serving CBSD concludes that it has an edge with a neighboring CBSD, if $Pr\{SIR \leq S_{th}\} \geq C_{th}$, as shown in FIG. 5. If it detects an edge, the corresponding edge-weight (at 618) is equivalent to the calculated probability value, i.e., $Pr\{SIR \leq S_{th}\}$. Alternatively, the serving CBSD concludes (620) that an edge connection does not exist with the corresponding neighboring CBSD if (at 614) the calculated probability value is less than the cut-off threshold ($C_{th}$).

A flow-chart of the proposed edge connection and edge weight determination method described above with reference to FIG. buses SIR as a decision parameter to estimate the edge connection. The flow chart does not illustrate the filtering of collected RSRP samples or estimated SIR samples as described above.

Figure 7:
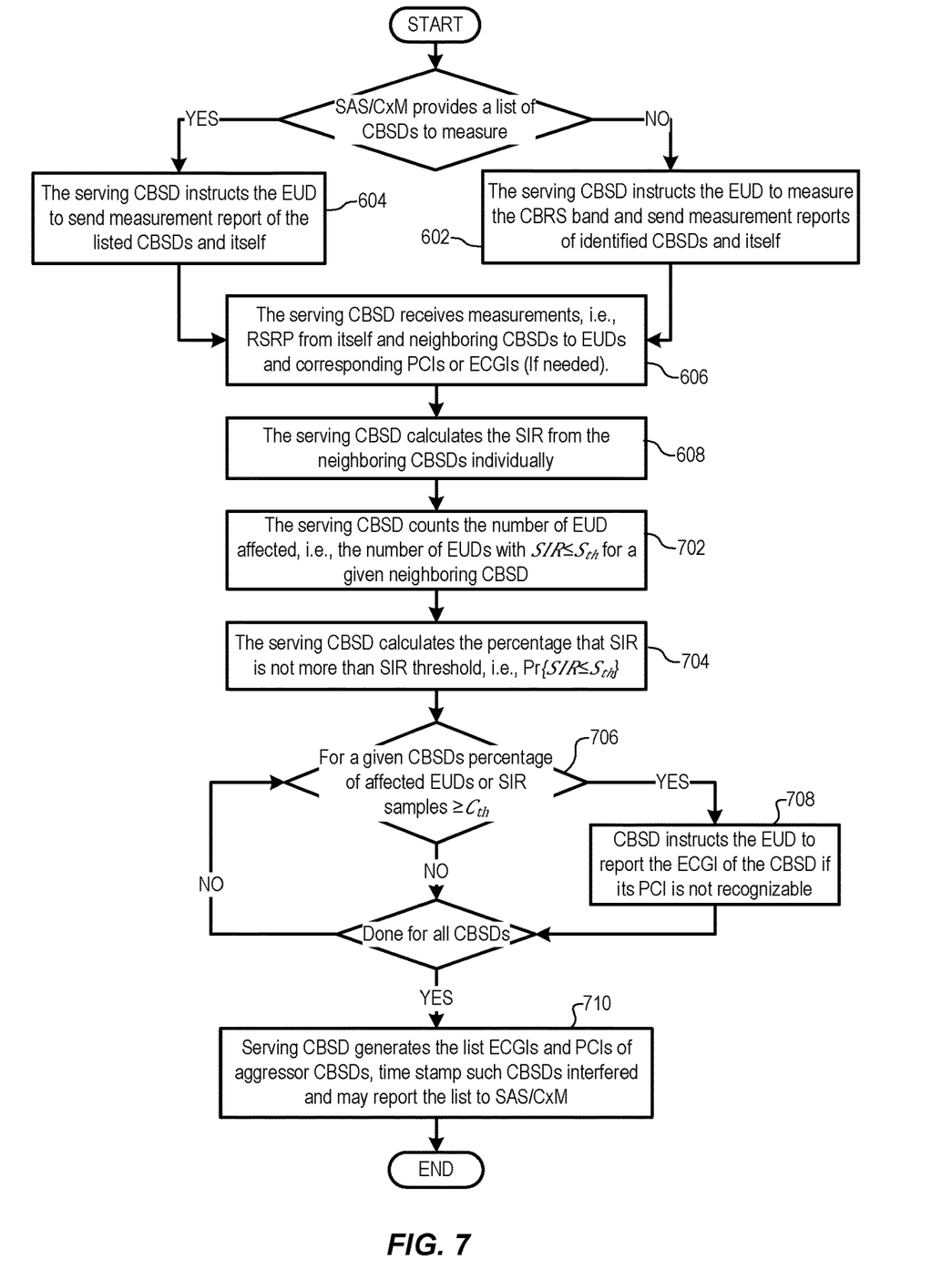
FIG. 7 is a flow chart illustrating a representative process in accordance with a further embodiment of the present invention

FIG. 7 illustrates another embodiment, in which a serving CBSD may estimate the edge connections without constructing the CDF (of either RSRP or SIR) as described above in Step 4. In such a case, the CBSD may compare the collected RSRP or calculated SIR samples with a threshold value (such as $S_{th}$ for SIR as in Step 4) and calculates the percentage of EUDs or instances impacted by neighboring CBSDs. To do so, it first counts (at 702) the number of EUDs or instances when a RSRP is not less than, or a SIR sample is not more than, the threshold value and then it calculates (at 704) the percentage of such events over all the events. The serving cell concludes that it has an edge with a neighboring CBSD if (at 706) the calculated percentage is not less than a cut-off threshold (such as $C_{th}$ for SIR in Step 4). Moreover, the calculated percentage is the corresponding edge-weight, if there exists an edge connection. Whichever is the decision parameter, either RSRP or SIR, the required threshold values are either provided by the SAS/CxM or decided by CBSD itself. When (at 706) the serving cell concludes that it has an edge with a neighboring CBSD, the CBSD may instruct (at 708) the EUD to report the ECGI of the neighboring CBSD if its PCI is not recognizable. The CBSD may also generate (at 610) a list of ECGIs and PCIs of aggressor CBSDs and send a corresponding report to SAS/CxM.

Those skilled in the art will recognize improvements and modifications to the embodiments of the present disclosure. All such improvements and modifications are considered within the scope of the concepts disclosed herein.

What is claimed is:

1. A network node of a communications network configured to provide Citizen Broadband Radio Service (CBRS) to at least one end user device (EUD) in a coverage area of the network node, the network node comprising:
    at least one processor; and
    a memory storing software instructions configured to control the at least one processor to perform steps of:
        detecting interference from at least one aggressor device in the network; and
        reporting the detected interference to at least one of a Spectrum Access System (SAS) and a co-existence manager (CxM) of the communications network;
    wherein detecting interference from at least one aggressor device in the network comprises;
        receiving, from each of the one or more EUDs in the coverage area of the network node, a respective report including, for each one of two or more signal sources: an identifier of the signal source, and a parameter value indicative of a respective power level of a signal received by the EUD from the signal source, the two or more signal sources comprising the network node and at least one interference signal source;
        calculating, for each one of the one or more EUDs in the coverage area of the network node, a respective Signal to Interference Ratio (SIR) value for each interference signal source, based on the received parameter values;
        calculating a respective Cumulative Distribution Function (CDF) for each interference signal source, based on the SIR values calculated for each one of the one or more EUDs;
        calculating, for each interference signal source, a respective probability that SIR is not more than a first predetermined threshold, based on the respective CDF of that interference signal source; and
        identifying each interference signal source as an aggressor device when the respective probability calculated for that interference signal source is equal to or more than a second predetermined threshold.

2. The network node as claimed in claim 1, wherein detecting interference from at least one aggressor device in the network comprises:
    detecting, by the network node, a respective interference signal transmitted by the at least one aggressor device; and
    detecting, by the network node, a unique global identifier of the at least one aggressor device.

3. The network node as claimed in claim 2, wherein the at least one aggressor device comprises any one or more of: another network node; and an end user device associated with the other network node.

4. The network node as claimed in claim 2, wherein the unique global identifier of the at least one aggressor device comprises any one or more of: a physical cell identifier (PCI); and a E-UTRAN Cell Global Identifier (ECGI).

5. The network node as claimed in claim 1, wherein the at least one interference signal source comprises at least one other network node.

6. The network node as claimed in claim 1, wherein the identifier of the interference signal source comprises any one or more of: a physical cell identifier (PCI); and a E-UTRAN Cell Global Identifier (ECGI).

7. The network node as claimed in claim 1, wherein the parameter value comprises a Reference Signal Received Power (RSRP).

8. The network node as claimed in claim 1, wherein the respective Signal to Interference Ratio (SIR) value for each interference signal source is calculated relative to the respective parameter value indicative of the power level of a signal received by the EUD from the network node.

9. The network node as claimed in claim 1, wherein the respective Signal to Interference Ratio (SIR) value calculated for each interference signal source comprises either one of:
  a Potential SIR (PSIR) representing the SIR that may be expected with respect to that interference signal source if a serving channel were shifted to operate on the same frequency assignment as the identified interference signal source; and
  an Actual SIR (ASIR) representing the SIR that is being experienced by the EUD with respect to the identified interference signal source.

10. A method in a network node of a communications network configured to provide Citizen Broadband Radio Service (CBRS) to at least one end user device (EUD) in a coverage area of the network node, the method comprising:
  detecting interference from at least one aggressor device in the network; and
  reporting the detected interference to at least one of a Spectrum Access System (SAS) and a co-existence manager (CxM) of the communications network;
  wherein detecting interference from at least one aggressor device in the network comprises:
    receiving, from each of the one or more EUDs in the coverage area of the network node, a respective report including, for each one of two or more signal sources: an identifier of the signal source, and a parameter value indicative of a respective power level of a signal received by the EUD from the signal source, the two or more signal sources comprising the network node and at least one interference signal source;
    calculating, for each one of the one or more EUDs in the coverage area of the network node, a respective Signal to Interference Ratio (SIR) value for each interference signal source, based on the received parameter values;
    calculating a respective Cumulative Distribution Function (CDF) for each interference signal source, based on the SIR values calculated for each one of the one or more EUDs;
    calculating, for each interference signal source, a respective probability that SIR is not more than a first predetermined threshold, based on the respective CDF of that interference signal source; and
    identifying each interference signal source as an aggressor device when the respective probability calculated for that interference signal source is equal to or more than a second predetermined threshold.

11. The method as claimed in claim 10, wherein detecting interference from at least one aggressor device in the network comprises:
  detecting, by the network node, a respective interference signal transmitted by the at least one aggressor device; and
  detecting, by the network node, a unique global identifier of the at least one aggressor device.

12. The method as claimed in claim 11, wherein the at least one aggressor device comprises any one or more of: another network node; and an end user device associated with the other network node.

13. The method as claimed in claim 11, wherein the unique global identifier of the at least one aggressor device comprises any one or more of: a physical cell identifier (PCI); and a E-UTRAN Cell Global Identifier (ECGI).

14. The method as claimed in claim 10, wherein the at least one interference signal source comprises at least one other network node.

15. The method as claimed in claim 10, wherein the identifier of the interference signal source comprises any one or more of: a physical cell identifier (PCI); and a E-UTRAN Cell Global Identifier (ECGI).

16. The method as claimed in claim 10, wherein the parameter value comprises a Reference Signal Received Power (RSRP).

17. The method as claimed in claim 10, wherein the respective Signal to Interference Ratio (SIR) value for each interference signal source is calculated relative to the respective parameter value indicative of the power level of a signal received by the EUD from the network node.

18. The method as claimed in claim 10, wherein the respective Signal to Interference Ratio (SIR) value calculated for each interference signal source comprises either one of:
  a Potential SIR (PSIR) representing the SIR that may be expected with respect to that interference signal source if a serving channel were shifted to operate on the same frequency assignment as the identified interference signal source; and
  an Actual SIR (ASIR) representing the SIR that is being experienced by the EUD with respect to the identified interference signal source.

19. A non-transitory computer readable medium storing software instructions configured to control at least one processor, of a network node of a communications network configured to provide Citizen Broadband Radio Service (CBRS) to at least one end user device (EUD) in a coverage area of the network node, to perform steps of:
  detecting interference from at least one aggressor device in the network; and
  reporting the detected interference to at least one of a Spectrum Access System (SAS) and a co-existence manager (CxM) of the communications network;
  wherein detecting interference from at least one aggressor device in the network comprises:
    receiving, from each of the or more EUDs in the coverage area of the network node, a respective report including, for each one of two or more signal sources: an identifier of the signal source, and a parameter value indicative of a respective power level of a signal received by the EUD from the signal source, the two or more signal sources comprising the network node and at least one interference signal source;
    calculating, for each one of the one or more EUDs in the coverage area of the network node, a respective Signal to Interference Ratio (SIR) value for each interference signal source, based on the received parameter values;
    calculating a respective Cumulative Distribution Function (CDF) for each interference signal source, based on the SIR values calculated for each one of the one or more EUDs;
    calculating, for each interference signal source, a respective probability that SIR is not more than a first predetermined threshold, based on the respective CDF of that interference signal source; and identifying each interference signal source as an aggressor device when the respective probability calculated for that interference signal source is equal to or more than a second predetermined threshold.

* * * * *

UNITED STATES PATENT AND TRADEMARK OFFICE
CERTIFICATE OF CORRECTION

PATENT NO. : 11,968,000 B2
APPLICATION NO. : 17/282053
DATED : April 23, 2024
INVENTOR(S) : Balachandran et al.

Page 1 of 2

It is certified that error appears in the above-identified patent and that said Letters Patent is hereby corrected as shown below:

In the Specification

In Column 2, Line 26, delete "WlnnForum" and insert -- WInnForum --, therefor.

In Column 4, Line 16, delete "edges" and insert -- edges. --, therefor.

In Column 4, Line 62, delete "invention" and insert -- invention. --, therefor.

In Column 8, Line 36, delete "CDSD1" and insert -- CBSD1 --, therefor.

In Column 8, Line 38, delete "CDSB1" and insert -- CBSD1 --, therefor.

In Column 8, Line 39, delete "CDSD2" and insert -- CBSD2 --, therefor.

In Column 8, Line 45, delete "CDSD1" and insert -- CBSD1 --, therefor.

In Column 8, Line 48, delete "CDSD2" and insert -- CBSD2 --, therefor.

In Column 8, Line 54, delete "CDSD1" and insert -- CBSD1 --, therefor.

In Column 8, Line 56, delete "CDSD1" and insert -- CBSD1 --, therefor.

In Column 8, Line 57, delete "CDSD2" and insert -- CBSD2 --, therefor.

In Column 8, Line 63, delete "CDSD1" and insert -- CBSD1 --, therefor.

In Column 8, Line 66, delete "CDSD2" and insert -- CBSD2 --, therefor.

In Column 10, Line 17, delete "samples in" and insert -- samples --, therefor.

Signed and Sealed this
Eighteenth Day of February, 2025

Coke Morgan Stewart
*Acting Director of the United States Patent and Trademark Office*

In Column 11, Line 9, delete "(that" and insert -- that --, therefor.

In Column 11, Line 45, delete "1" and insert -- 1: --, therefor.

In Column 12, Line 54, delete "CQ1$_{th}$," and insert -- CQI$_{th}$, --, therefor.

In Column 13, Line 62, delete "may" and insert -- may: --, therefor.

In Column 14, Line 52, delete "Pas" and insert -- PCIs --, therefor.

In Column 15, Line 32, delete "buses" and insert -- 6 uses --, therefor.

In the Claims

In Column 16, Line 12, in Claim 1, delete "comprises;" and insert -- comprises: --, therefor.

In Column 18, Line 45, in Claim 19, delete "or more" and insert -- one or more --, therefor.